United States Patent
Payne

(10) Patent No.: US 9,992,933 B2
(45) Date of Patent: Jun. 12, 2018

(54) ATTACHMENT ASSEMBLY FOR HYDRAULICALLY ACTUATED RAMS OF A SHAKER HEAD

(71) Applicant: David Payne, Shafter, CA (US)

(72) Inventor: David Payne, Shafter, CA (US)

( * ) Notice: Subject to any disclaimer, the term of this patent is extended or adjusted under 35 U.S.C. 154(b) by 100 days.

(21) Appl. No.: 15/221,227

(22) Filed: Jul. 27, 2016

(65) Prior Publication Data

US 2017/0231157 A1    Aug. 17, 2017

Related U.S. Application Data

(60) Provisional application No. 62/295,330, filed on Feb. 15, 2016.

(51) Int. Cl.
*A01D 46/00*    (2006.01)
*A01D 46/26*    (2006.01)

(52) U.S. Cl.
CPC .................................. *A01D 46/26* (2013.01)

(58) Field of Classification Search
CPC ....... Y10T 403/32631; Y10T 29/49895; Y10T 403/32196; Y10T 403/32204; F16C 11/04; F16C 11/106; F16C 11/06; B60G 7/005; B60G 2204/416; B60D 1/141; A01D 46/26; A01D 2046/262; A01D 46/28; A01B 59/041
See application file for complete search history.

(56) References Cited

U.S. PATENT DOCUMENTS

| | | | |
|---|---|---|---|
| 3,596,972 A | | 8/1971 | Pool |
| 3,896,612 A | * | 7/1975 | McHugh ................ A01D 46/26 56/329 |
| 3,964,244 A | * | 6/1976 | Vallicella ............... A01D 46/26 56/329 |
| 4,265,464 A | * | 5/1981 | Lange .................. A01B 59/041 172/450 |
| 4,558,881 A | * | 12/1985 | Manteufel ............ A01B 59/068 172/443 |
| 4,776,217 A | | 10/1988 | Nolan |
| 5,406,780 A | | 4/1995 | Laserson et al. |
| 5,413,453 A | | 5/1995 | Hill |
| 6,938,403 B2 | | 9/2005 | Suter et al. |
| 6,966,104 B2 | * | 11/2005 | Gregel .................... B25B 27/10 269/231 |
| 7,186,030 B2 | * | 3/2007 | Schlanger ............. B60B 27/023 384/538 |
| 7,757,471 B2 | | 7/2010 | Mayo |
| 7,918,078 B2 | | 4/2011 | Poggiagliolmi et al. |
| 8,347,976 B2 | * | 1/2013 | Bernhardt ............ A01B 59/066 172/444 |

(Continued)

FOREIGN PATENT DOCUMENTS

CN          202950796 U  *  5/2013  .............. A61F 2/64

*Primary Examiner* — Arpad Fabian-Kovacs
(74) *Attorney, Agent, or Firm* — James M. Duncan, Esq.; Klein DeNatale Goldner

(57) ABSTRACT

In a shaker head for a tree shaker, a hydraulically actuated ram is mounted between the clamping arm and frame of the shaker head with a pin assembly which extends into a spherical bearing disposed within an aperture of the shaker head. The spherical bearing allows a certain amount of misalignment and provides a through-hardened and lubricated wear point which prevents or reduces structural failure in the shaker head components.

20 Claims, 7 Drawing Sheets

(56) References Cited

U.S. PATENT DOCUMENTS

| 9,072,224 | B1 | 7/2015 | Flora et al. | |
|---|---|---|---|---|
| 2004/0112035 | A1 | 6/2004 | Suter et al. | |
| 2005/0191120 | A1* | 9/2005 | Oellers | F16C 11/0652 |
| | | | | 403/133 |
| 2009/0085364 | A1 | 4/2009 | Pellenc et al. | |
| 2010/0013181 | A1* | 1/2010 | Knopp | B60G 7/005 |
| | | | | 280/93.511 |
| 2010/0024373 | A1* | 2/2010 | Pellenc | A01D 46/28 |
| | | | | 56/330 |
| 2015/0328946 | A1* | 11/2015 | von der Haar | F16C 11/0642 |
| | | | | 403/76 |
| 2016/0115674 | A1* | 4/2016 | Graham | E02F 9/2891 |
| | | | | 37/456 |
| 2017/0292561 | A1* | 10/2017 | Payne | A01D 46/26 |

* cited by examiner

ATTACHMENT ASSEMBLY FOR HYDRAULICALLY ACTUATED RAMS OF A SHAKER HEAD

BACKGROUND OF THE INVENTION

The present invention relates generally to tree shakers for harvesting nuts, fruits, and other tree-borne crops, and more specifically to an improved tree shaker head having an improved assembly for attaching a hydraulically actuated ram within the shaker head.

Tree shakers are known in the art for harvesting nuts, fruits, and other tree-borne products. Shakers typically employ a boom extending forwardly from a tractor or other device, with a shaker head present at the end of the boom for grasping a tree and imparting a shaking force to the tree. The shaker head is positioned around a tree and when the hydraulically actuated ram on the clamp cylinder is energized, pads on the inside of the shaker head compress and conform round the trunk, while subtly twisting the shaker head into alignment. The hydraulic system then sequences from the clamping circuit to the shaking circuit, launching the shaker head into a vigorous shaking pattern during which the crop of fruit or nuts rains down in a cloud of dust and debris. When the shake control is released dynamic braking is applied and the shaker head brakes hard to a stop. The shaker head is then unclamped and the unit moves onto another tree. This process is repeated, often several times a minute depending upon the tree spacing and operator, until all trees in the orchard have been shaken. The shaking action of the device dislodges fruits, nuts, and other products, which then fall from the branches of the tree to be harvested. The shaking action is aggressive, with severe loads imparted to various components of the device, particularly within the shaker head.

The commonly used tree shaker comprises a frame having a hollow welded steel case structure containing the drive sheave, drive belt, two or more eccentric rotating masses, one or more hydraulically actuated rams and hydraulic hose routings. A hydraulic motor typically mounts within or on the top of the case structure and is connected to a drive pulley. A stationary arm is integral to or affixed to the frame. Opposing the stationary arm is a clamping arm which is attached to the rear of the frame by a pivot pin. The clamping arm applies a compressive force during the shaking process when a hydraulically actuated ram is actuated, causing the clamp arm to pivot about the pivot pin and move toward the stationary arm, causing the clamping arm and stationary arm to close about a tree trunk. Once the arms of the head are closed about the tree trunk, vibration is initiated within the shaker head. Typically the shakers use stacked counter rotating eccentric mass energy wheels to generate the vibration or pulse, which is created by the rotation of an eccentric mass about a fixed common shaft. Once the shaking cycle is finished, a hydraulically actuated ram causes the clamping arm to open with respect to the stationary arm.

It is to be appreciated that the various components of the shaker head are subjected to significant loading during the shaking cycle of the above described process, which is repeated almost immediately and repeatedly, but each time all components of the shaker head are twisted into alignment. As a result of this repeated sequence, various shaker head components are continually stressed and subject to wear and failure. The inventor herein has found that some of the most common wear and failure points in existing shaker heads are the end connectors of the hydraulically actuated ram(s) utilized to open and close the clamping arm with respect to the stationary arm, and the structural components of the shaker head to which the end connectors of the hydraulically actuated ram(s) are attached. The end connectors utilized for attaching the hydraulically actuated ram(s) to the clamping arm are typically a clevis type connector as shown in FIG. 2 which is attached to an attachment point on the shaker on the frame or the clamping arm by a pin. Because of the inevitable misalignment of the clamping arm with the stationary arm as the head repeatedly engages trees, followed by the significant loads imposed on these joints as the shaker is engaged, all components of the hydraulically actuated ram and related attachment structures of the shaker head are subject to failure. These failures are expensive to repair and failure typically results in a shaker being idled during the critical harvesting season.

SUMMARY OF THE INVENTION

Embodiments of the present invention address the problem identified above. There are a variety of different tree shakers which are utilized for harvesting crops from trees, but each of the shakers generally utilizes one or more hydraulically actuated rams to close the shaker head about the tree trunk. The present invention provides a spherical bearing (sometimes referred to as a spherical-radial bearing) on one or both ends of the hydraulically actuated ram, where the spherical bearings allow a certain amount of misalignment and which provide a through-hardened and lubricated wear point which prevents or reduces structural failure in the shaker head components including, but not limited to, pins and pin bosses. The spherical bearings are relatively easy to replace and allow a machine to be expeditiously repaired if a spherical bearing is worn.

Embodiments of the present invention may be utilized in a shaker head of the type having a frame having case structure which generally contains a drive sheave, a drive belt, at least one eccentric rotating mass, a hydraulic motor mounted within or on the case structure, a stationary arm integral to the frame or affixed to the frame, and a clamping arm in opposite relation to the stationary arm. The clamping arm, which may also have a case structure, is pivotally attached to the frame. A hydraulically actuated ram is connected between the frame and the clamping arm, where the operation of the hydraulically actuated ram causes the clamping arm to open and close with respect to the stationary arm, thereby providing the clamping force for locking the shaker head around a tree trunk. The hydraulically actuated ram comprises a cylinder housing and a piston slidingly disposed within the cylinder housing.

Embodiments of the present invention provide an attachment assembly for attaching either end of the hydraulically actuated ram to the shaker head. It is to be appreciated that the present invention may be utilized for attaching either a single end or both ends of the hydraulically actuated ram to the shaker head.

Components of the attachment assembly include a first end of the cylinder housing of the hydraulically actuated ram which end may be integral to the housing, where the first end has a first aperture. Similarly, the piston portion of the hydraulically actuated ram may have a second end which may be integral to the piston, where the second end has a second aperture. A first spherical bearing may be disposed within the first aperture and, optionally, a second spherical bearing may be disposed in the second aperture. A first pin assembly attaches the first end of the cylinder housing to a first attachment aperture in either the clamping arm or the frame, where the first attachment aperture may extend through the entire case structure, with a boss on either side of the first attachment aperture. The first pin assembly is made up of a first male member having which has external threads and a first sleeve member which has internal threads, where the first male member makes up to the first sleeve member, typically fully making up to one another such that the threads of the male member are fully made up within the first sleeve member. The first male member may have a head which may abut a first boss on the case structure. The first sleeve member may also have a head which abuts a second boss on the case structure.

The first pin assembly may be disposed within the first attachment aperture such that the first sleeve is inserted through the first spherical bearing. A second pin assembly may be used to attach the second end integral to the piston to a second attachment aperture in the frame or the clamping arm. The second pin assembly is made up of a second male member having external threads and a second sleeve member having internal threads. The second pin assembly is disposed within the second attachment aperture such that the second sleeve is inserted through the second spherical bearing.

Embodiments of the attachment assembly for a shaker head actuator provides for the wear points to be concentrated within the hardened spherical bearing and the hardened sleeve which surrounds each of the pins. Further structural elements of the invention may include structural reinforcement, such as bosses, at the attachment apertures in the clamping arm and the frame. A spherical bearing may be inserted within the first aperture of the hydraulically actuated ram and the first end of the cylinder housing inserted between opposing plates in the clamping arm, where a top spacer may be placed between the top plate of the clamping arm and the spherical bearing, a bottom spacer may be placed between the spherical bearing and the bottom plate of the clamping arm. When the pin assembly is installed, the first male member is made up into the threads of the first sleeve member, where making up the first male member preloads the spherical bearing within the first aperture. Likewise, installation of the second pin assembly preloads the spherical bearing within the second aperture. The purpose of the preload is to eliminate movement and vibration in both the axial and radial directions, eliminating undesirable wear in all related components.

The spherical bearing may have a hardened outer ring, a hardened inner ring and one or more lubrication ports. The inventor herein has found that an inner diameter of 2½ inches for the spherical bearing, where the pin assembly sleeve has an outside diameter in accord with the bearing diameter, provides acceptable service.

DETAILED DESCRIPTION OF THE INVENTION

In the present disclosure, terms designating orientation, direction, or relative position, such as the terms upper, lower, top, bottom, inward, outward, right, left, etc., are made with respect to orientations, directions, and relative positions as indicated in the Figures herein. However, such terms are utilized herein with respect to the drawings only, and such terms do not limit the application of embodiments of the invention as actually utilized.

Figure 1:
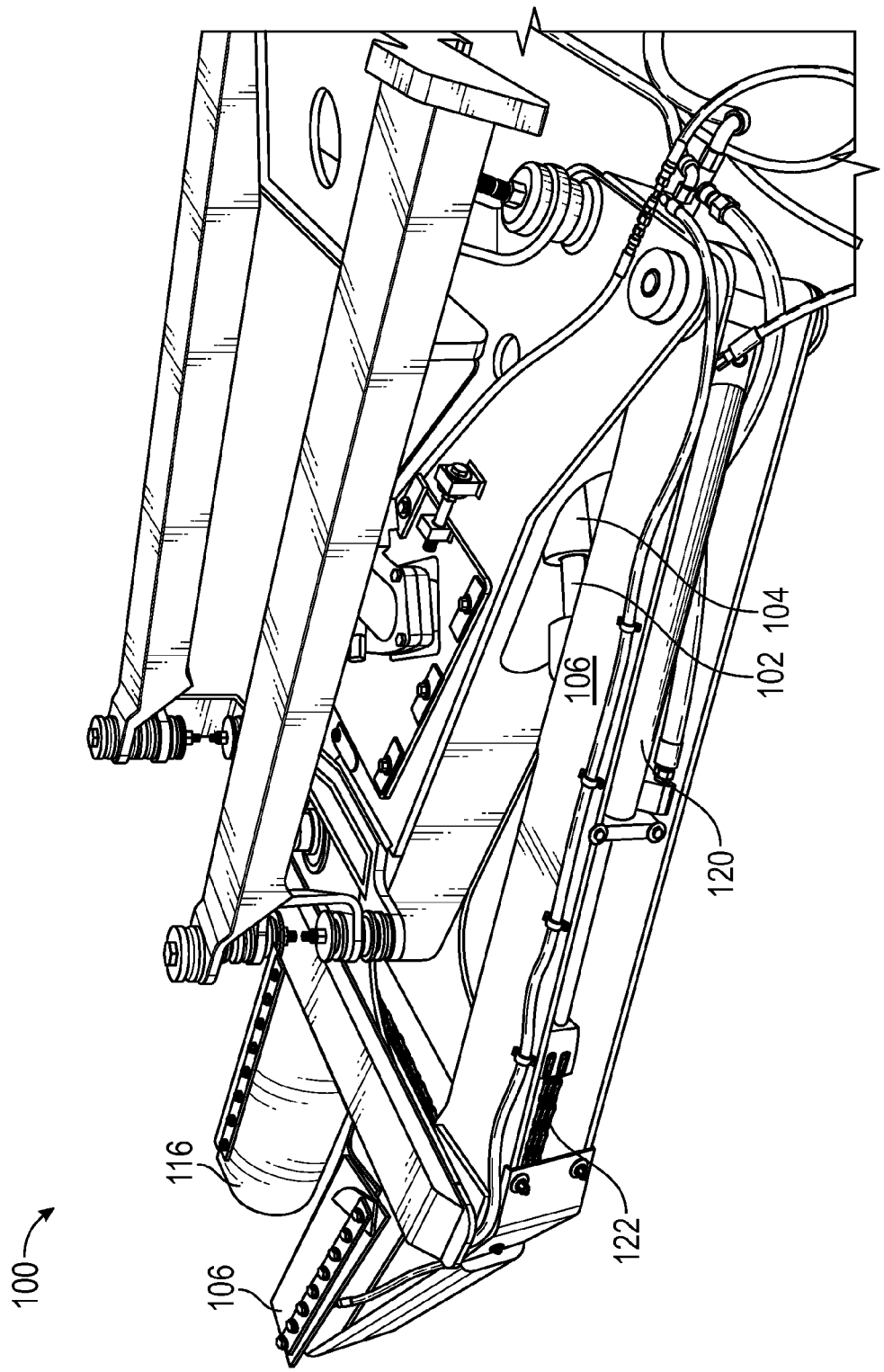
FIG. 1 depicts a prior art shaker head.

Referring now to the figures, FIG. 1 depicts a prior art shaker head 100 as generally utilized for shaking trees to drop the crop to the ground. The embodiment of FIG. 1 shows an embodiment in which two hydraulically actuated rams 104, 120 are utilized to open and close the clamping arm 106 with respect to the stationary arm 116. Hydraulically actuated ram 104 is utilized to close the clamping arm while hydraulically actuated ram 120 pulls chain 122 which pulls the clamping arm away from stationary arm 116 to open the shaker head 100.

Figure 2:
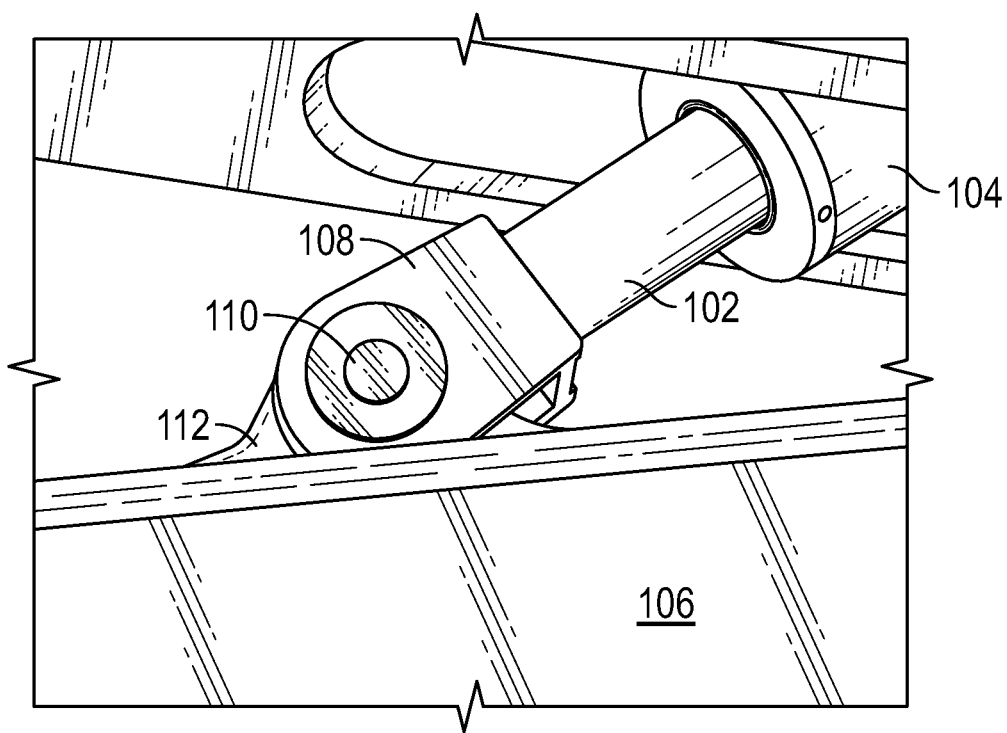
FIG. 2 shows how the piston end of a hydraulically actuated ram is installed in the prior art shaker head of FIG. 1.

FIG. 2 shows a typical prior art structure for attaching the components of a hydraulically actuated ram 104 to a shaker head. In this example, piston 102 of hydraulically actuated ram 104 is attached to the clamping arm 106 by a clevis 108 on the piston with pin 110 inserted through the clevis 108 and through an ear member 112 on the clamping arm 106. In this embodiment, the retraction of piston 102 into hydraulically actuated ram 104 operates to close the clamping arm 106 toward the stationary arm 116. In this type connection, among other shaker head components, pin 110, clevis 108 and ear member 112 are subjected to significant loads as the hydraulically actuated ram 104 maintains the shaker head in the closed position about a tree trunk during the shaking operation. This configuration typically results in wear and potentially failure in each of these components.

Figure 3:
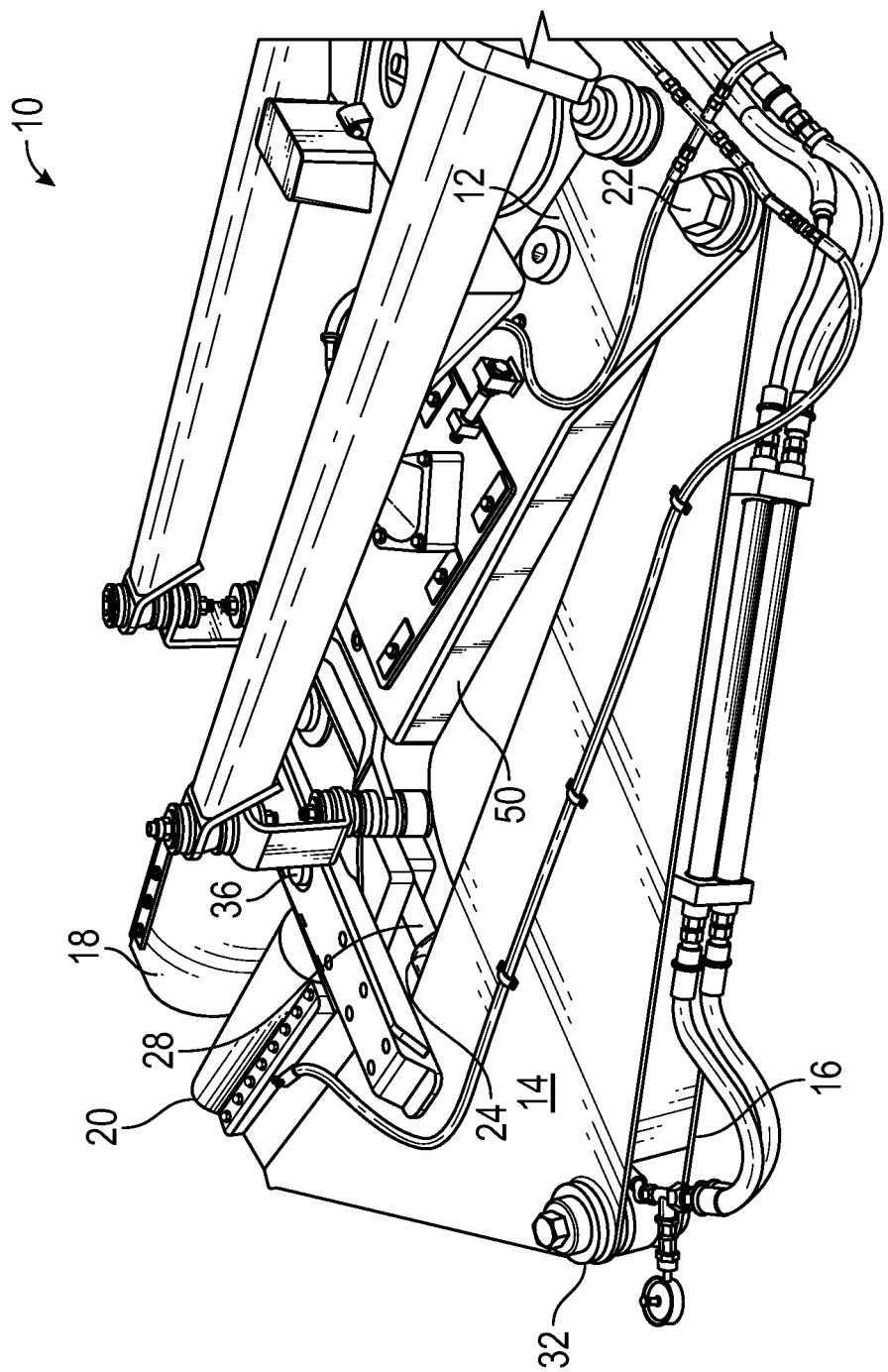
FIG. 3 depicts a shaker head which incorporates an embodiment of the attachment assembly of the present invention for attaching an end of a hydraulically actuated ram within a shaker head.

FIG. 3 depicts a shaker head 10 equipped with an embodiment of the present attachment assembly for the hydraulically actuated ram of the shaker head. In this embodiment, a single hydraulically actuated ram 24 is required to open and close the shaker head as compared to the shaker head 100 depicted in FIGS. 1 and 2.

For embodiments of the present invention, the shaker head 10 has a frame 12. The shaker head 10 has a stationary arm 18 which typically is an integral component of the frame 12 with the stationary arm 18 extending outwardly from the front of the frame. Shaker head 10 also has a clamping arm 20 which is pivotally attached by a pivot pin 22 to frame 12. Frame 12 and clamping arm 20 typically each have a case structure comprising a top plate 14 and a bottom plate 16.

Other internal components of the shaker head, such as a hydraulic motor, drive sheave, drive belts, eccentric rotating weights and other components, which are not shown, will typically be contained in the space between top plate 14 and bottom plate 16. Structural support members, such as vertical plate 50, will connect top plate 14 and bottom plate 16.

A hydraulically actuated ram 24 connects frame 12 to clamping arm 20. For the embodiment shown in FIG. 3, the hydraulically actuated ram 24 is disposed between top plate 14 and bottom plate 16 of clamping arm 20 toward the front of the shaker head 10, i.e., the end of the shaker head having the clamping arm 20 and the stationary arm 18. The hydraulically actuated ram 24 has a cylinder housing 26 and a piston 28 which extends and retracts as hydraulic pressure is applied to the ram. It is to be appreciated that for this embodiment of the shaker head 10, a single hydraulically actuated ram 24 is required to open and close the clamping arm 20 with respect to the stationary arm 18 as compared to the prior art shaker head shown in FIGS. 1-2 which requires two hydraulically actuated rams 104, 120.

The hydraulically actuated ram 24 may have an end 30 integral to the cylinder housing 26 where end 30 is connected to an attachment point 32 of the clamping arm 20. The hydraulically actuated ram 24 may also have an end 34 which is attached to piston 28 where end 34 is connected to an attachment point 36 in frame 12. The attachment points 32, 36 typically comprise apertures 52 through the case structure of frame 12 and clamping arm 20. Apertures 52 may be reinforced with bosses 54 projecting from the plates through which the apertures 52 extend.

Figure 9:
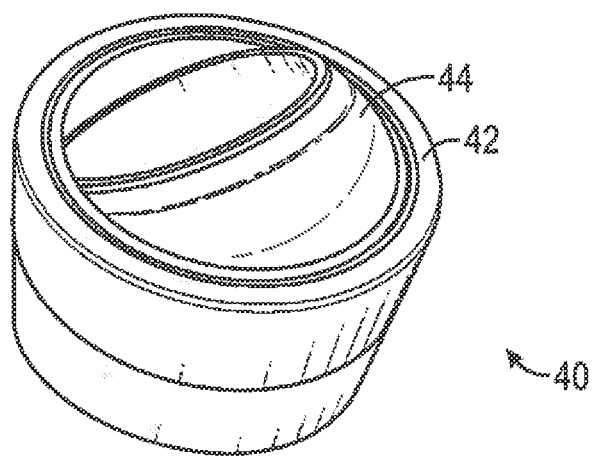
FIG. 9 depicts a spherical bearing which may be utilized in embodiments of the present invention.

End 30 of cylinder housing 26 has an aperture 38 into which a spherical bearing 40 may be placed. The spherical bearing comprises a hardened outer ring 42 and a hardened inner ring 44, which floats within the outer ring and allows tilt (i.e., self-aligning) movement of the inner ring with respect to the outer ring as indicated in FIG. 9. Similarly, end 34, which is attached to piston 28, has an aperture 46 into which a spherical bearing 40 may also be placed. As indicated above, embodiments of the present invention may be utilized to attach both ends of the hydraulically actuated ram 24 between the frame 12 and the clamping arm 20, or for attaching a single end of the ram to either the frame or clamping arm.

Figure 4:
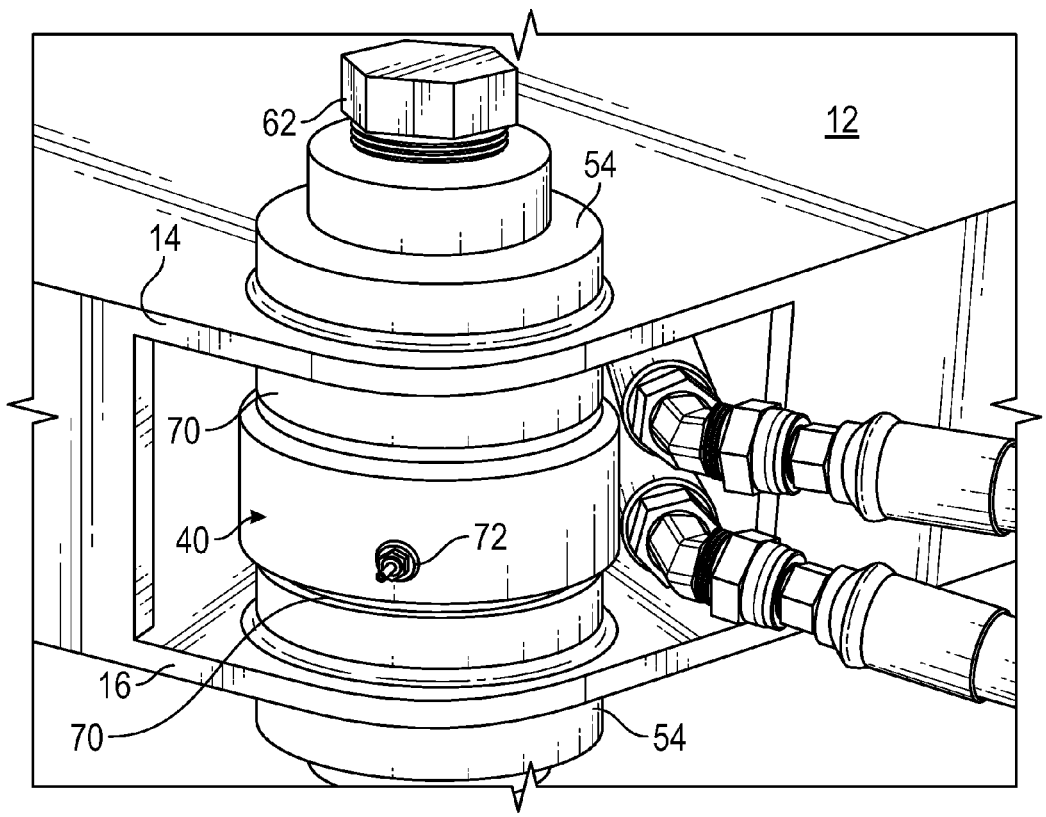
FIG. 4 shows a close up of the attachment assembly of the present invention utilized on the cylinder end of a hydraulically actuated ram.
Figure 5:
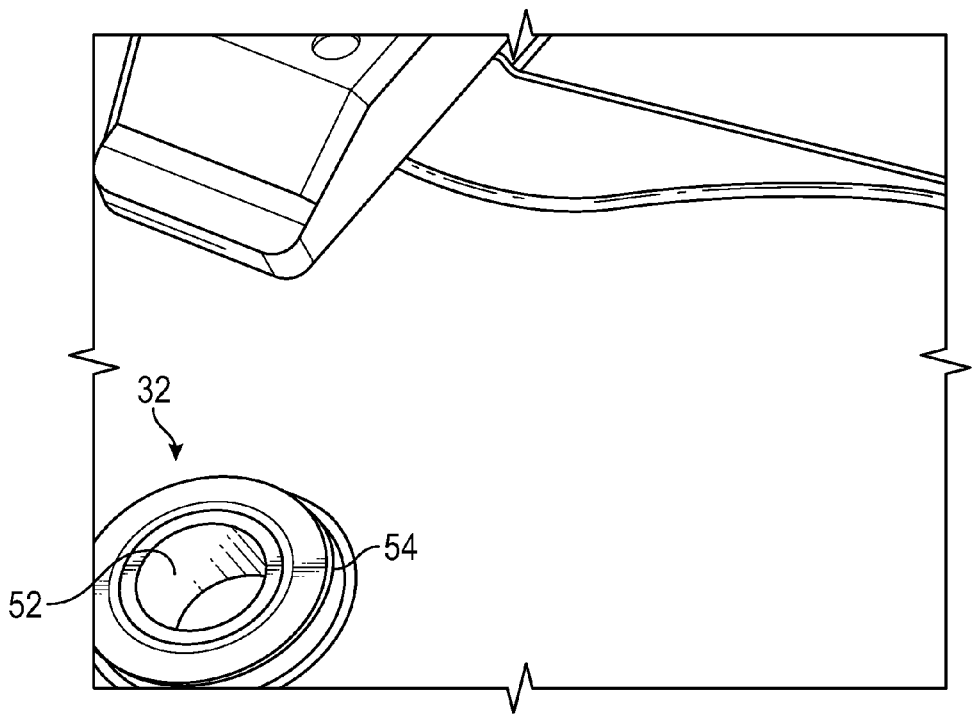
FIG. 5 depicts an attachment point in the case structure for an end of a hydraulically actuated ram.
Figure 6:
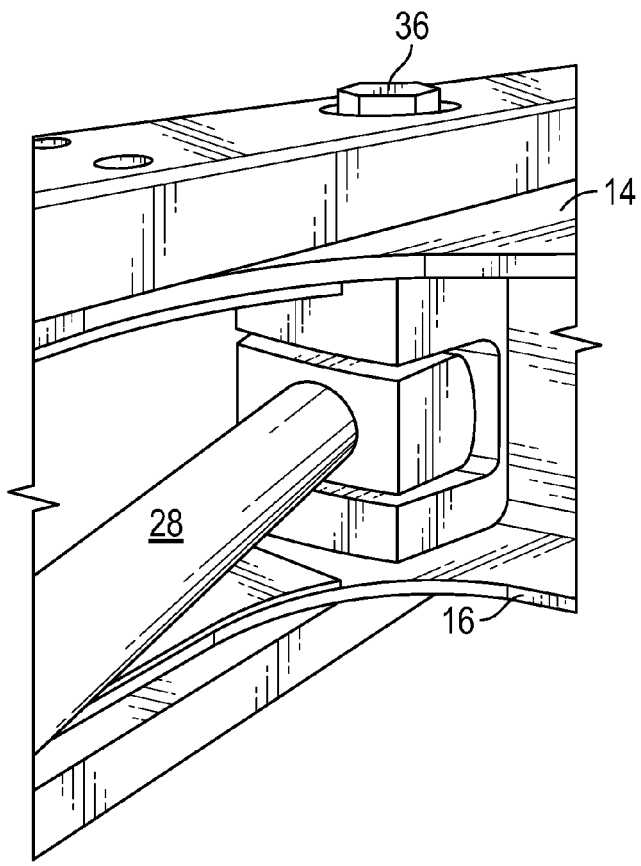
FIG. 6 shows a close up of the piston end of the hydraulically actuated ram which utilizes the same type of attachment assembly as for the cylinder end depicted in FIG. 4.
Figure 7:
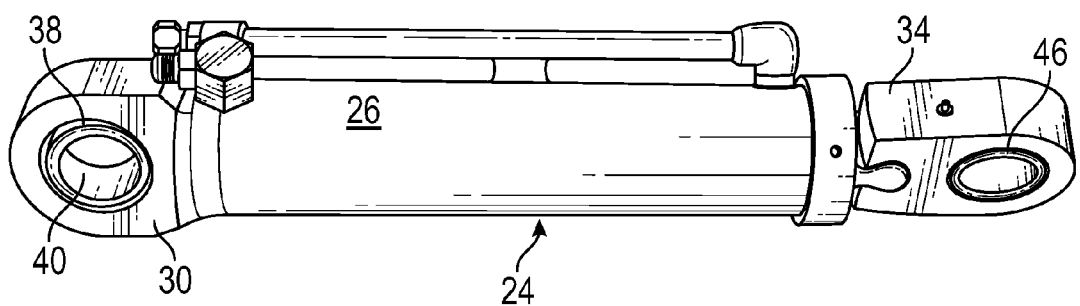
FIG. 7 shows a hydraulically actuated ram of the present invention showing the first aperture and second aperture of the ram, with a spherical bearing inserted within each aperture.

FIGS. 4 and 5 show close-up views of attachment point 32 in the clamping arm 20. As further shown in FIG. 8, attachment point 32 may have opposite facing apertures 52 placed within top plate 14 and a bottom plate 16. The apertures 52 may comprise a boss 54 projecting from either side of top plate 14 and bottom plate 16 to provide additional structural strength. The configuration of attachment point 36 may be the same as that described above for attachment point 32.

Figure 8:
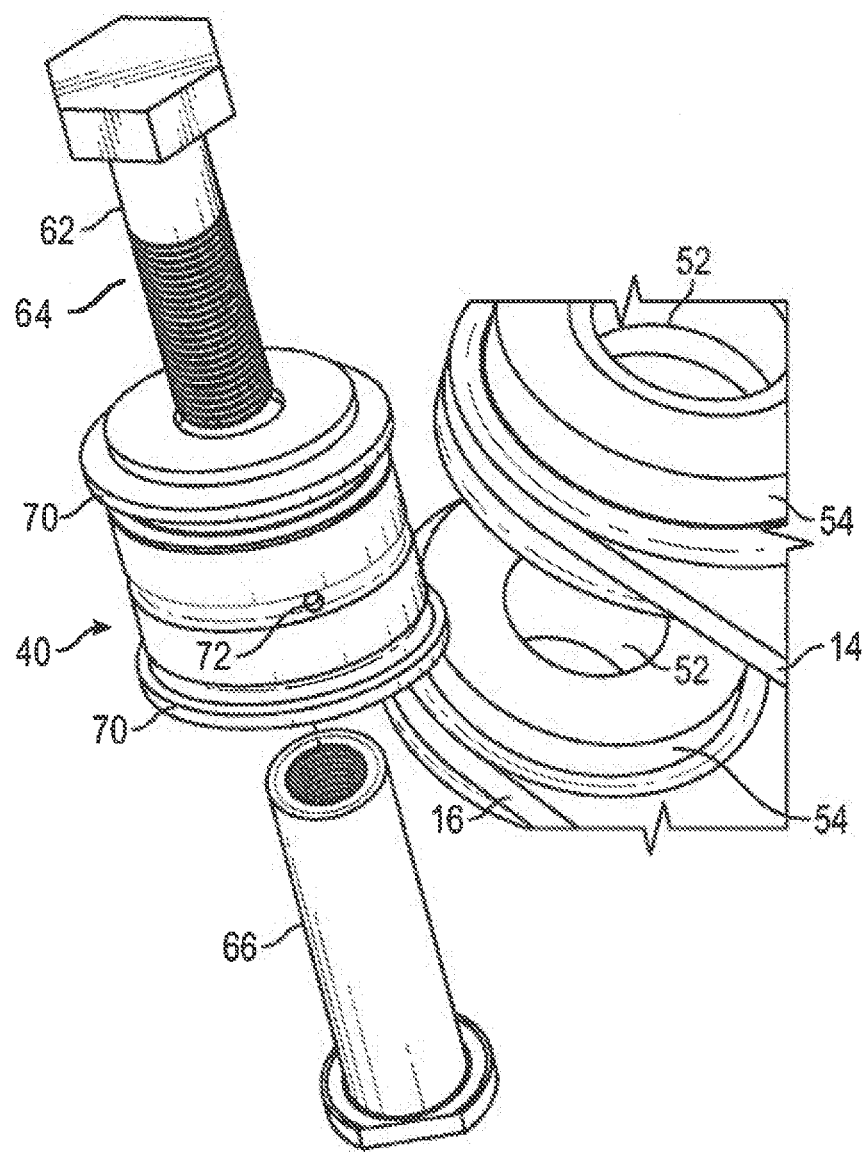
FIG. 8 shows an exploded view depicting the relative positions of the fastener assembly, spacer plates and spherical bearing when installed with a hydraulically actuated ram (not shown) to a shaker head.

As depicted in the exploded view of FIG. 8, a pin assembly 60 attaches each end of the hydraulically actuated ram 24 to attachment points 32, 36. Spacers 70 may be placed on either side of spherical bearing 40. Spherical bearing 40 may also have a lubrication port 72.

Figure 10:
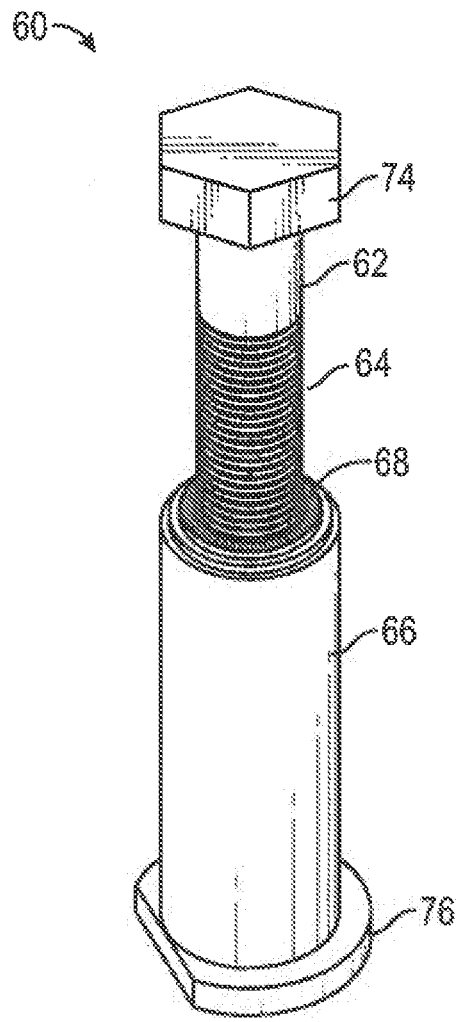
FIG. 10 depicts a pin assembly which may be utilized in embodiments of the present invention.

An embodiment of pin assembly 60 is depicted in detail in FIG. 10. Pin assembly 60 may have a male member 62 having external threads 64 and head 74 Pin assembly 60 may further have a sleeve member 66 where the sleeve member has internal threads 68 and sleeve head 76. When installed, a separate pin assembly 60 may be inserted within the apertures 52 at each of the attachment points 32 and 36 such that the pin assembly is inserted through the spherical bearing 40 within each end of the hydraulically actuated ram 24, with the sleeve member 66 immediately adjacent to the inner ring 44 of the spherical bearing. It is to be appreciated that when the pin assembly is installed substantial torque may be applied without imposing any binding on spherical bearing 40 because of the configuration of the pin assembly 60 and bosses 54. With this configuration, the pin assemblies 60 connecting the respective ends of hydraulically actuated ram 24 to the attachment points 32, 36 may float or tilt during the shaking operation without wear in the attachment points and related structure.

Having thus described the invention, what is claimed as new and desired to be protected by Letters Patent includes the following:

The invention claimed is:

1. In a shaker head comprising a frame wherein the frame comprises a stationary arm, the shaker head further comprising a clamping arm in opposite relation to the stationary arm, the clamping arm pivotally attached to the frame, the clamping arm configured to open and close in relation with the stationary arm, and a hydraulically actuated ram connected between the frame and the clamping arm, wherein the hydraulically actuated ram comprises a cylinder housing, a first end, and a piston slidingly disposed within the cylinder housing, an attachment assembly for attaching the hydraulically actuated ram to the shaker head comprises:
   a first aperture disposed in the first end of the hydraulically actuated ram;
   a first spherical bearing disposed within the first aperture;
   a first pin assembly which attaches the first end to a first attachment aperture in the shaker head, the first pin assembly comprising a first male member having external threads and a first sleeve member having internal threads, wherein the first pin assembly is disposed within the first attachment aperture such that the first sleeve is inserted through the first spherical bearing.

2. The attachment assembly of claim 1 wherein the first aperture is integral to the cylinder housing.

3. The attachment assembly of claim 1 wherein the first attachment aperture is disposed within the clamping arm.

4. The attachment assembly of claim 1 wherein the first attachment aperture is disposed within the stationary arm.

5. The attachment assembly of claim 1 wherein the frame comprises a case structure having a top plate and a bottom plate and a top spacer is disposed between the top plate and the spherical bearing and a bottom spacer is disposed between the spherical bearing and the bottom plate.

6. The attachment assembly of claim 1 wherein the first spherical bearing comprises a lubrication port.

7. The attachment assembly of claim 1 wherein the first spherical bearing comprises a hardened outer ring and a hardened inner ring disposed within the hardened outer ring.

8. In a shaker head comprising a frame, a stationary arm affixed to the frame and a clamping arm in opposite relation to the stationary arm, the clamping arm pivotally attached to the frame and a hydraulically actuated ram connected between the frame and the clamping arm, wherein the hydraulically actuated ram comprises a cylinder housing and a piston slidingly disposed within the cylinder housing, an attachment assembly for attaching the hydraulically actuated ram to the shaker head comprises:
   a first end integral to the cylinder housing, the first end comprising a first aperture;
   a second end integral to the piston, the second end comprising a second aperture;
   a first spherical bearing disposed within the first aperture;
   a second spherical bearing disposed within the second aperture;

a first pin assembly which attaches the first end to a first attachment aperture in the clamping arm, the first pin assembly comprising a first male member having external threads and a first sleeve member having internal threads, wherein the first pin assembly is disposed within the first attachment aperture such that the first sleeve is inserted through the first spherical bearing; and a second pin assembly which attaches the second end to a second attachment aperture in the frame, the second pin assembly comprising a second male member having external threads and a second sleeve member having internal threads, wherein the second pin assembly is disposed within the second attachment aperture such that the second sleeve is inserted through the second spherical bearing.

9. The attachment assembly of claim 8 wherein the frame comprises a case structure having a top plate and a bottom plate and a top spacer is disposed between the top plate and the spherical bearing and a bottom spacer is disposed between the spherical bearing and the bottom plate.

10. The attachment assembly of claim 8 wherein the first spherical bearing comprises a lubrication port.

11. The attachment assembly of claim 8 wherein the first spherical bearing comprises a hardened outer ring and a hardened inner ring disposed within the hardened outer ring.

12. The attachment assembly of claim 8 wherein the first attachment aperture comprises a boss.

13. In a shaker head comprising a frame and a clamping arm pivotally attached to the frame and a hydraulically actuated ram extends between a first attachment point at the frame and a second attachment point at the clamping arm, an apparatus for attaching the hydraulically actuated ram to the frame comprises:

a first pin assembly which attaches a first end of the hydraulically actuated ram to a first attachment aperture at the first attachment point, wherein the first pin assembly comprises a first male member having external threads and a first sleeve member having internal threads;

a first spherical bearing disposed within the first attachment aperture;

wherein the first spherical bearing comprises an inner ring disposed within an outer ring, wherein the inner ring may tilt within the outer ring, wherein the first sleeve member of the first pin assembly is inserted through the first spherical bearing.

14. The apparatus of claim 13 further comprising a second pin assembly which attaches a second end of the hydraulically actuated ram to a second attachment aperture at the second attachment point, wherein the second pin assembly comprises a second male member having external threads and a second sleeve member having internal threads.

15. The apparatus of claim 14 further comprising a second spherical bearing disposed within the second attachment aperture.

16. The apparatus of claim 15 wherein the second spherical bearing comprises an inner ring disposed within an outer ring, wherein the inner ring may tilt within the outer ring, wherein the second sleeve member of the second pin assembly is inserted through the second spherical bearing.

17. The apparatus of claim 13 wherein the frame comprises a case structure having a top plate and a bottom plate and the first attachment aperture extends through the top plate and the bottom plate.

18. The apparatus of claim 17 wherein a top spacer is disposed between the top plate and the spherical bearing and a bottom spacer is disposed between the spherical bearing and the bottom plate.

19. The apparatus of claim 13 wherein the first spherical bearing comprises a lubrication port.

20. The apparatus of claim 13 wherein the frame comprises a stationary arm and the stationary arm comprises the first attachment aperture.

* * * * *